2 sheets — No 1.

M. Gordon.
Cornstalk-Cutter & Cultivator.
Nº 76909    Patented Apr. 21, 1868

Witnesses:
T. Smith
L. E. Jones

Inventor:
Matthew Gordon
by atty T. T. Everett 2 sheets. No. 2.

M. Gordon.
Cornstalk-Cutter & Cultivator.
N° 76909        Patented Apr. 21, 1868

Witnesses:
T. Smith
S. C. Jones.

Inventor:
Matthew Gordon
by Atty T. T. Everett

United States Patent Office.

MATTHEW GORDON, OF WASHINGTON, IOWA.

Letters Patent No. 76,909, dated April 21, 1868.

IMPROVED COMBINED CORNSTALK-CUTTER, CULTIVATOR, &c.

*The Schedule referred to in these Letters Patent and making part of the same.*

TO ALL WHOM IT MAY CONCERN:

Be it known that I, MATTHEW GORDON, of Washington, in the State of Iowa, have invented a certain new and useful Combined Cornstalk-Cutter, Cultivator, and Pulverizer; and I do hereby declare that the following is a full, clear, and exact description of the same, reference being had to the accompanying drawings, and to the letters and marks thereon.

The drawings, forming part of this specification, show a cornstalk-cutter, cultivator, and pulverizer constructed under my invention—

Figure 1:
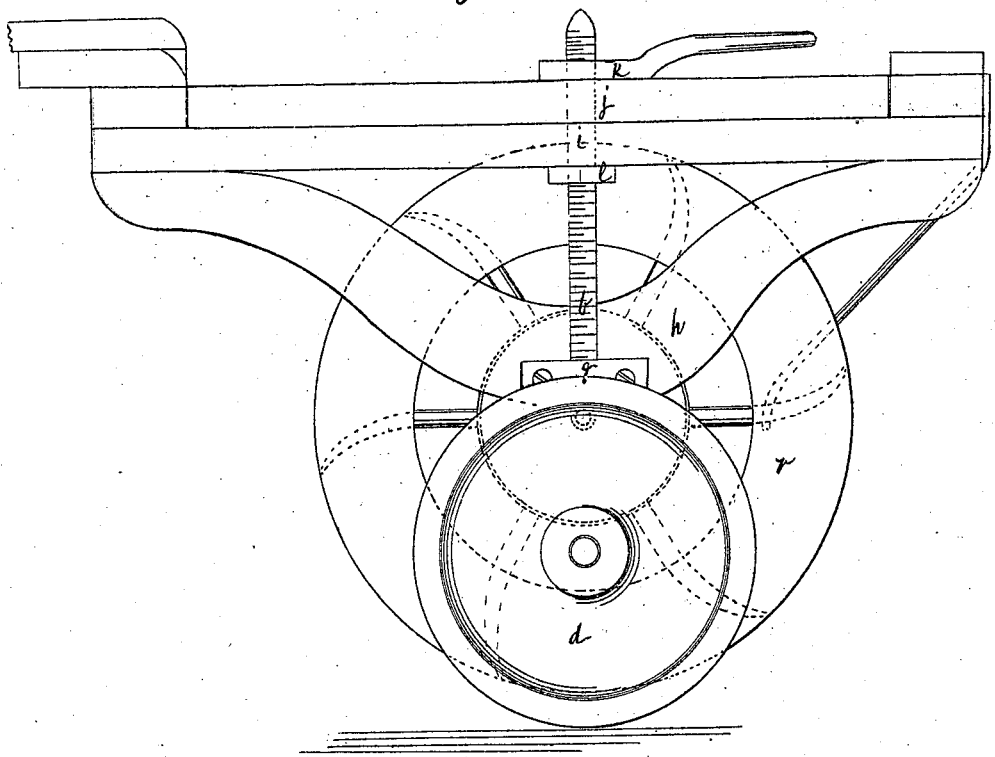
Figure 2:
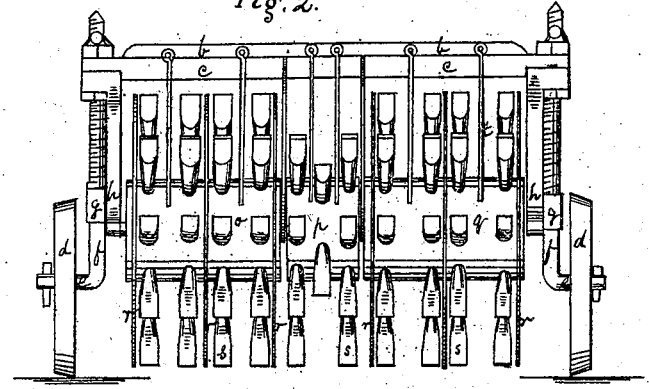

Figure 1 thereof being a side view,

Figure 2 a back-end view, and

Figure 3:
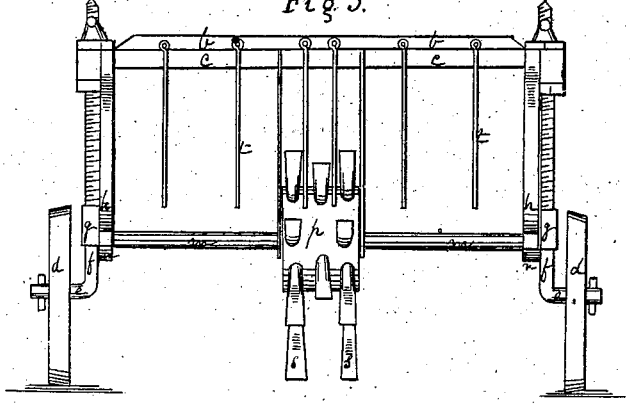

Figure 3 a like end view with a part of the cylinders detached.

In each of these figures, like marks and letters are used to indicate like parts.

The frame, $a$, is so constructed that it may be contracted or be widened out. The plates or strips, $b$, on the front and rear bars, $c$, which are divided, are connected to the bars by screws, so that the plates may readily be detached, and the sides of the frame and wheels, $d$, be brought nearer to or placed further off from each other.

The wheels $d$ are on the bent ends, $e$, of the rods or bars $f$, which bars pass through the clamping-plates $g$, affixed to the frame-bar $h$, and up through the frame-bar $i$ and platform $j$. From the clamping-plate $g$ to their upper ends, these rods $f$ have screw-threads, so that, by moving the binding-nut $k$, the jaw-nut $l$ being loosened, the wheels $d$ may be raised or lowered, and the machine be set as desired.

The shaft, $m$, of the cutter and tooth-cylinders has its bearings, $n$, on the lower part of the bar $h$. These can easily be detached, and the ends of the shaft removed from the bearings, so that the cylinders can be taken off and put on the shaft.

There are three cylinders, $o$, $p$, and $q$. The cylinders $o$ and $q$ have stalk-cutters, $r$, and cultivator-teeth or hoes, $s$. The cylinder $p$ has the teeth or hoes $s$ only. When all the cylinders are on the shaft, the machine can be used as a stalk-cutter and plough and harrow, the stalks being cleared from the teeth by the clearers $t$. When the centre cylinder, $p$, is left on only, the machine can be used as a hoe or cultivator and pulverizer of the soil, and when the centre cylinder is removed, and the other two, $o$ and $q$, put on, the machine can be used for dressing or tending corn.

In place of the teeth shown by the drawings on the centre cylinder, hoes or harrow-teeth may be affixed to the cylinder, and the machine, with this cylinder only, be used for the garden as a hand-machine, or as a single corn-tender.

The teeth are shown screwed into the cylinder, but any other suitable way of affixing the teeth may be substituted, and the machine may have more than the three cylinders, and may be made of any desirable dimensions.

As shown by the drawings, the cutter and tooth-cylinders are loose on the shaft, and are rotated on it, the shaft being stationary. The cylinders may, however, be affixed to the shaft, so as to rotate with it.

What I claim as my invention, and desire to secure by Letters Patent, is—

The cylinders $o$ $p$ $q$, with cutters and teeth or hoes arranged upon the shaft, and operated substantially as and for the purposes herein recited.

This specification signed, this 18th day of February, 1868.

MATTHEW GORDON.

Witnesses:
HUGH SMITH,
J. M. DANY.